United States Patent [19]

Kaeding

[11] 4,082,805

[45] Apr. 4, 1978

[54] PRODUCTION OF ALIPHATIC AMINES UTILIZING A CRYSTALLINE ALUMINOSILICATE CATALYST OF ZSM-5, ZSM-11 OR ZSM-21

[75] Inventor: W. W. Kaeding, Westfield, N.J.

[73] Assignee: Mobil Oil Corporation, New York, N.Y.

[21] Appl. No.: 520,069

[22] Filed: Nov. 1, 1974

[51] Int. Cl.$^2$ ............................................... C07C 85/02
[52] U.S. Cl. ........................... 260/585 B; 208/111; 252/455 Z; 260/448 C; 423/328; 423/332
[58] Field of Search ...................... 260/505 B; 423/328

[56] References Cited

U.S. PATENT DOCUMENTS

| | | | |
|---|---|---|---|
| 1,946,245 | 2/1934 | Swallen | 260/585 B X |
| 1,992,935 | 3/1935 | Arnold | 260/585 B X |
| 2,098,289 | 11/1937 | Greenewalt | 260/585 B X |
| 2,113,241 | 5/1938 | Punnett | 260/585 B X |
| 2,394,515 | 2/1946 | Goshorn | 260/583 |
| 2,394,516 | 2/1946 | Goshorn | 260/583 |
| 2,851,461 | 9/1958 | Zellner | 260/585 B X |
| 3,384,667 | 5/1968 | Hamilton | 260/585 B |
| 3,387,032 | 6/1968 | Leonard | 260/585 B |
| 3,702,886 | 11/1972 | Argauer et al. | 260/448 C |
| 3,709,979 | 1/1973 | Chu | 260/448 C |
| 3,875,235 | 4/1975 | Noeske et al. | 260/585 B |

FOREIGN PATENT DOCUMENTS

| | | | |
|---|---|---|---|
| 463,711 | 6/1935 | United Kingdom | 260/585 B |

*Primary Examiner*—Daniel E. Wyman
*Assistant Examiner*—John J. Doll
*Attorney, Agent, or Firm*—Charles A. Huggett; Raymond W. Barclay

[57] ABSTRACT

Process for the production of aliphatic amines by reaction of a $C_1$–$C_5$ alcohol or ether with ammonia in the presence of a catalyst comprising a crystalline aluminosilicate having the structure of ZSM-5, ZSM-11 or ZSM-21, said reaction being effected at a temperature between about 300° and about 500° C., a pressure between atmospheric and 1000 psig with the relative feed rates, expressed in grams per hour, of (1) alcohol or ether and (2) ammonia being within the approximate range of 1:1 to 5:1.

10 Claims, No Drawings

PRODUCTION OF ALIPHATIC AMINES UTILIZING A CRYSTALLINE ALUMINOSILICATE CATALYST OF ZSM-5, ZSM-11 OR ZSM-21

BACKGROUND OF THE INVENTION

1. Field of the Invention

This invention relates to a process for the production of aliphatic amines by reaction of a $C_1$–$C_5$ alcohol or ether with ammonia in the presence of a particular crystalline aluminosilicate catalyst.

2. Description of the Prior Art

The reaction of lower aliphatic alcohols or ethers with ammonia in the vapor phase to produce amines is well known. One usually gets a mixture of primary, secondary and tertiary amines and water. The proportion of the various amines produced can be varied somewhat by the ratio of alcohol or ether to ammonia in the feed, i.e., large ratios give tertiary while low ratios tend to give primary amines. Temperatures of 300°–500° C. and pressures of 10–200 atmospheres have been employed in carrying out such reactions, generally in the presence of dehydrating catalysts, such as alumina. Dehydration of the alcohol or ether reactant, however, can also occur, to yield an olefin and water, thereby resulting in reduced yields of the desired product.

Aluminum phosphate has also been used as a catalyst to prepare isopropyl amines from ammonia and isopropyl alcohol at 200 atm pressure and a temperature of 350° C. This reaction, described in British Pat. No. 649,980, reported an alcohol conversion of 80 percent with a selectivity of 46 percent to mixed isopropyl amines.

Amines have also been produced from alcohols, ammonia and hydrogen over hydrogenation catalysts. It has been reported that mono-, di-, and tributylamines have been prepared from n-butyl alcohol, ammonia and hydrogen at 190° C. over a pelletized nickel catalyst.

Use of the above described prior art catalysts has not provided a process wherein selective production of one class of amines, e.g. primary amines, over other classes of amines, notably secondary and tertiary amines, has been capable of achievement to a marked degree.

SUMMARY OF THE INVENTION

In accordance with the present invention, there has been discovered a process for producing aliphatic amines by reaction of a compound having the formula:

where R is a straight or branched chain alkyl group of 1 to 5 carbon atoms and R' is a similar alkyl group or hydrogen with ammonia in the presence of a catalyst having the structure of ZSM-5, ZSM-11 or ZSM-21.

The present process comprises contacting the noted reactants in the presence of the specified catalyst at a temperature within the approximate range of 300° to 500° C. and preferably between about 350° C. and about 450° C. The pressure during reaction is generally between atmospheric and 1000 psig and the relative feed rates measured in grams per hour of (1) aliphatic alcohol or ether and (2) ammonia within the approximate range of 1:1 to 5:1 and preferably between about 2:1 to 4:1.

The reaction product may be a mixture of primary, secondary and tertiary aliphatic amines which can either be collected as a combined amine product or separated into the respective mono, secondary and tertiary components. In general, the secondary and tertiary amines comprise a smaller fraction of the reaction products as the size and molecular weight of the alcohol or ether reactant increases. Thus, utilizing the present process in the production of propyl amine, only the normal amine was obtained as product.

DESCRIPTION OF SPECIFIC EMBODIMENTS

The catalyst employed in this invention is a crystalline aluminosilicate zeolite of high silica to alumina ratio, greater than 5 and preferably greater than 30. Operative catalysts include zeolite ZSM-5 type (including zeolite ZSM-11) and zeolite ZSM-21.

Zeolite ZSM-5 is a crystalline aluminosilicate zeolite having a composition in terms of mole ratios of oxides as follows:

wherein M is at least one cation having a valence $n$, Y is at least 5, $z$ is between 0 and 40. This zeolite is further characterized by a specified X-ray diffraction pattern shown below in Table I.

TABLE I

| Interplanar Spacing d(A): | Relative Intensity |
|---|---|
| 11.1 ± 0.2 | s. |
| 10.0 ± 0.2 | s. |
| 7.4 ± 0.15 | w. |
| 7.1 ± 0.15 | w. |
| 6.3 ± 0.1 | w. |
| 6.04 ± 0.1 | w. |
| 5.97 | |
| 5.56 ± 0.1 | w. |
| 5.01 − 0.1 | w. |
| 4.60 ± 0.08 | w. |
| 4.25 ± 0.08 | w. |
| 3.85 ± 0.07 | v.s. |
| 3.71 − 0.05 | s. |
| 3.04 ± 0.03 | w. |
| 2.99 ± 0.02 | w. |
| 2.94 ± 0.02 | w. |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs), the interplanar spacing in A°, corresponding to the recorded lines, were calculated. In Table I the relative intensities are given in terms of the symbols s. = strong, w. = weak and v.s. = very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it had been subjected to thermal treatment.

Zeolite ZSM-5 and its preparation are more particularly described in U.S. Pat. No. 3,702,886, the disclosure of which is incorporated herein by reference.

Zeolite ZSM-11, here considered as a member of the group designated "ZSM-5 type" is described in U.S. Pat. No. 3,709,979.

Preparation of synthetic zeolite ZSM-21 is typically accomplished as follows: A first solution comprising 3.3 g. sodium aluminate (41.8% $Al_2O_3$, 31.6% $Na_2O$ and 24.9% $H_2O$), 87.0 g. $H_2O$ and 0.34 g. NaOH (50% solution with water) was prepared. The organic material pyrrolidine was added to the first solution in 18.2 g. quantity to form a second solution. Thereupon, 82.4 g. colloidal silica (29.5% $SiO_2$ and 70.5% $H_2O$) was added to the second solution and mixed until a homogeneous gel was formed. This gel was composed of the following components in mole ratios:

| | |
|---|---|
| $\dfrac{R^+}{R^+ + M^+}$ | 0.87, wherein M is sodium and R is the pyrrolidine ion. |
| $\dfrac{OH^-}{SiO_2}$ | 0.094 (not including any contribution of $OH^-$ from pyrrolidine) |
| $\dfrac{H_2O}{OH^-}$ | 210 (Not including any contribution of $OH^-$ from pyrrolidine) |
| $\dfrac{SiO_2}{Al_2O_3}$ | 30.0 |

The mixture was maintained at 276° C. for 17 days, during which time crystallization was complete. The product crystals were filtered out of solution and water washed for approximately 16 hours on a continuous wash line.

X-ray analysis of the crystalline product proved the crystals to have a diffraction pattern as shown in Table I.

TABLE I

| d (A) | $I/I_o$ |
|---|---|
| 9.5 ± 0.30 | Very strong |
| 7.0 ± 0.20 | Medium |
| 6.6 ± 0.10 | Medium |
| 5.8 ± 0.10 | Weak |
| 4.95 ± 0.10 | Weak |
| 3.98 ± 0.07 | Strong |
| 3.80 ± 0.07 | Strong |
| 3.53 ± 0.06 | Very Strong |
| 3.47 ± 0.05 | Very Strong |
| 3.13 ± 0.05 | Weak |
| 2.92 ± 0.05 | Weak |

Chemical analysis of the crystalline product led to the following compositional figures:

| Composition | Wt. % | Mole Ratio on $Al_2O_3$ Basis |
|---|---|---|
| N | 1.87 | — |
| Na | 0.25 | — |
| $Al_2O_3$ | 5.15 | 1.0 |
| $SiO_2$ | 90.7 | 29.9 |
| $N_2O$ | — | 1.54 |
| $Na_2O$ | — | 0.11 |
| $H_2O$ | — | 9.90 |

Physical analysis of the crystalline product calcined 16 hours at 1000° F. showed it to have a surface area of 304 m²/g and adsorption tests produced the following results:

| Adsorption | Wt. % |
|---|---|
| Cyclohexane | 1.0 |
| n-Hexane | 5.4 |
| Water | 9.0 |

In determining the sorptive capacities, a weighed sample of zeolite was heated to 600° C. and held at that temperature until the evolution of basic nitrogeneous gases ceased. The zeolite was then cooled and the sorption test run at 12 mm for water and 20 mm for hydrocarbons.

Zeolite ZSM-21 is the subject of copending application Ser. No. 358,192, filed May 7, 1973, now abandoned; filed as a continuation-in-part application Ser. No. 393,767 on Sept. 4, 1973, now abandoned; which in turn was filed as a continuation-in-part application Ser. No. 528,060 on Nov. 29, 1974, now abandoned; which in turn was filed as a continuation-in-part application Ser. No. 560,412 on Mar. 20, 1975.

The zeolite is converted from its as synthesized alkali metal form to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable ions of Groups I-B to VIII of the Periodic Table including by way of example, nickel, zinc or rare earth metals. Prior to use, the zeolite is calcined in an inert atmosphere, e.g. helium or in an oxygen-containing atmosphere, e.g. air. Calcination takes place at a temperature in the approximate range of 300° to 700° C. and preferably between about 450° C and 550° C.

In practicing the process of the invention, it may be desirable to incorporate the zeolite in another material resistant to the temperatures and other reaction conditions employed. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the modified zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of finely divided zeolite and inorganic oxide gel matrix may vary widely with the zeolite content ranging from between about 1 to about 99 percent by weight and more usually in the range of about 5 to about 80 percent by weight of the composite. A particularly suitable combination is one containing about 65 weight percent of the zeolite in 35 weight percent of a relatively inactive alumina matrix.

The alcohol or ether reactant employed in the present process is characterized by the formula:

where R is a straight or branched chain alkyl group of 1 to 5 carbon atoms and R' is a similar alkyl group or hydrogen. In the case of ethers, R and R' may be either identical or of differing chain length within the above defined limitations. Representative alcohols and ethers for use in the present process include methyl alcohol, ethyl alcohol, propyl alcohol, butyl alcohol, pentyl alcohol, isopropyl alcohol, isobutyl alcohol, isopentyl alcohol, dimethyl ether, dipentyl ether, dibutyl ether, dipropylether, diethylether, methyl-ethyl ether, methyl-propyl ether, ethyl-propyl ether, propyl-butyl ether, methyl-pentyl ether and methyl-butyl ether. Of the foregoing group of alcohols and ethers, those wherein either R or R' is a group higher than methyl, i.e. an alkyl group of 2 to 5 carbon atoms, have been found to result in selective production of the primary amine.

Production of aliphatic amines in the presence of the described catalyst is effected by contact of ammonia with the alcohol or ether reactant at a temperature between about 300° to about 500° C. and preferably between about 350° and about 450° C. At the higher temperatures, the zeolites of high silica/alumina ratio are preferred. For example, ZSM-5 of 300 $SiO_2/Al_2O_3$ ratio and upwards is very stable at high temperatures. The reaction generally takes place at atmospheric pressure, but the pressure may be within the approximate range of 1 atmosphere to 1000 psig. The relative feed rates, expressed in grams per hour, of (1) alcohol or ether and (2) ammonia are generally within the approximate range of 1:1 to 5:1 and preferably between about 2:1 to 4:1. The reaction product may comprise predominately or solely a primary amine. In those instances where some di- or trialiphatic amines are formed, together with the water of reaction, they may be separated by any suitable means, such as by distillation or chromatographic separation.

The following examples will serve to illustrate the process of this invention without limiting the same:

EXAMPLES 1–3

ZSM-5 crystals were obtained using the following reactants:

Silicate Solution 42.2 lb. Q-Brand Sodium Silicate ($Na_2O/SiO_2$ = 3.3)
52.8 lb. Water

Acid Solution 612 grams Aluminum Sulfate
1600 grams Sulfuric Acid
7190 grams Sodium Chloride
72.2 lb. Water

Organics 1290 grams Tri-n-propylamine
1110 grams n-Propylbromide

The silicate solution and acid solution were nozzle mixed to form a gelatinous precipitate that was charged to a 30 gallon stirred autoclave. When gelation was complete the organics were added and the temperature raised to 315° F. with agitation. The reaction mixture was held at 315° F. with an agitation rate of 121 RPM for 17 hours. The product at this time was analyzed by X-ray diffraction and was reported to be ZSM-5. The product was then washed free of soluble salts and dried. Analysis of the product gave the following in terms of mole ratios:

| | |
|---|---|
| $Al_2O_3$ | 1.0 |
| $SiO_2$ | 74.4 |
| $Na_2O$ | 0.31 |
| N | 2.26 |
| C | 21.9 |

The ZSM-5 so prepared was precalcined in air at 370° C. and thereafter ammonium exchanged by contacting twice with 5N $NH_4Cl$ solution at 100° C. (15 ml. per gram zeolite), once for 16 hours, the second time for 4 hours, filtered, washed free of chloride and air dried.

The resulting ammonium form of ZSM-5 was converted to the hydrogen form by calcination in air at 1° C/minute to 538° C. and then held at 538° C. for 10 hours.

The resulting HZSM-5 so obtained was pelleted and screened to 8–12 mesh. A 4.4 gram (12.5 ml.) sample was loaded into a reactor, heated in flowing nitrogen at 500 for 1 hour and the temperature was then lowered to the reaction temperature for 10 minutes before use in the amine production run.

Runs were made at temperatures of 350° C. and 450° C. by passing (1) methanol or methyl ether and (2) ammonia over the catalyst. A summary of the experimental results for Examples 1–3 is presented in Table II.

TABLE II

| Example | 1 | 2 | 3 |
|---|---|---|---|
| Temp., °C | 350 | 450 | 450 |
| ORGANIC FEED | $CH_3OH$ | $CH_3OH$ | $CH_3OCH_3$ |
| FEED RATES g/hr | | | |
| $CH_3OH$ | 15.13 | 14.65 | — |
| $CH_3OCH_3$ | — | — | 10.50 |
| $NH_3$ | 5.0 | 5.0 | 5.0 |
| COMPOUNDS RECOVERED gms/hr, wt. % | | | |
| $NH_3$ | 3.63g | 1.96g | 1.90g |
| | 18.3% | 10.1% | 11.8% |
| $CH_3OCH_3$ | 2.44g | 0.82g | 0.71g |
| | 12.3% | 4.2% | 4.4% |
| $CH_3NH_2$ | 0.5g | 0.86g | 1.03g |
| | 0.3% | 4.4% | 5.4% |
| $(CH_3)_2N + (CH_3)_3N$ | 2.67g | 7.30g | 8.11g |
| | 13.5% | 37.6% | 50.5% |
| $CH_3OH$ | 6.82g | 0.65g | 0.38g |
| | 34.4% | 3.4% | 2.4% |
| $H_2O$ | 4.19g | 7.81g | 3.96g |
| | 21.2% | 40.3% | 24.6% |

From the above results, it will be seen that the experiments conducted at 450° C. produced greater yields of the methyl amines than at 350° C. With the use of the low molecular weight methyl alcohol or ether, the amount of di- and tri-amine was greater than the amount of mono amine. The use of methyl ether compared with methyl alcohol afforded an improved yield of the desired product.

EXAMPLES 4–5

ZSM-21 crystals were obtained using the following reactants:

A. Silicate Solution 101.6 g. Q-Brand Silicate (28.8 wt. % $SiO_2$, 8.9 wt. % $Na_2O$)
6.5 g. 50% NaOH solution
59.8 g. $H_2O$

B. Acid Alum Solution 19.4 g. $Al_2(SO_4)_3 \cdot 18H_2O$
4.5 g. $H_2SO_4$ 174 g. H₂O C. Ethylenediamine 30.0 g.

These solutions were mixed together adding solution C to solution A then adding solution B and mixing vigorously for 15 minutes. The mixture was charged to a polypropylene jar and sealed. This was held for 62 days at 210° F. in a non-stirred state to allow the product to crystallize.

The solid crystalline product was filtered from the slurry and water washed to remove unreacted soluble components and then dried at 230° F.

X-ray analyses established the material as ZSM-21.

Product analysis on dried sample were as follows:

| | |
|---|---|
| N | 3.09 wt. % |
| Na | 0.07 wt. % |
| Al₂O₃ | 10.1 wt. % |
| SiO₂ | 85.2 wt. % |
| Solids | 88.4 wt. % |

Sorption properties after calcination 16 hours at 1000° F. were:

| | |
|---|---|
| Cyclohexane | 2.2 wt. % |
| n-Hexane | 5.3 wt. % |
| H₂O | 13.9 wt. % |

The surface area was 347 m²/g.

Production of methyl amines by reaction of ammonia and methanol or methyl ether using the above prepared ZSM-21 is carried out in the manner of Examples 1-3. A summary of the experimental results for these examples is shown in Table III below:

TABLE III

| Example | 4 | 5 |
|---|---|---|
| Temp., ° C. | 400 | 450 |
| Organic Feed | CH₃OH | CH₃OCH₃ |
| Feed Rates g/hr | | |
| CH₃OH | 14.90 | — |
| CH₃OCH₃ | — | 10.50 |
| NH₃ | 5.0 | 5.0 |
| Compounds Recovered gms/hr, wt. % | | |
| NH₃ | 1.50 (7.5%) | 1.00 (6.4%) |
| CH₃OCH₃ | .55 (2.7%) | .50 (3.2%) |
| CH₃NH₂ | .95 (4.7%) | 1.50 (9.6%) |
| (CH₃)₂N + (CH₃)₃N | 8.50 (42.4%) | 8.20 (52.4%) |
| CH₃OH | .45 (2.2%) | .20 (1.3%) |
| H₂O | 0.10 (40.4%) | 4.25 (27.1%) |

EXAMPLES 6-7

A catalyst of HZSM-11 is used for catalyzing the reaction of ammonia with methyl alcohol and methyl ether as described in the preceding examples with the following results:

TABLE IV

| Example | 6 | 7 |
|---|---|---|
| Temp., ° C. | 375° C. | 435° C. |
| Organic Feed | CH₃OH | CH₃OCH₃ |
| Feed Rates g/hr | | |
| CH₃OH | 15.1 | — |
| CH₃OCH₃ | — | 11.5 |
| NH₃ | 5.0 | 5.0 |
| Compounds Recovered gms/hr, wt. % | | |
| NH₃ | 2.25 (11.7%) | 1.50 (9.4%) |
| CH₃OCH₃ | 1.40 (7.3%) | 1.00 (6.3%) |
| CH₃NH₂ | 1.25 (6.5%) | 1.75 (11.0%) |
| (CH₃)₂N + (CH₃)₃N | 7.00 (36.4%) | 7.50 (47.2%) |
| CH₃OH | .80 (4.2%) | .15 (.9%) |
| H₂O | 6.50 (33.9%) | 4.00 (25.2%) |

EXAMPLE 8

A catalyst of HZSM-5, prepared as described in Examples 1-3, was employed in the preparation of ethyl amines.

For such purpose, diethylether, 19.4 ml/hr and ammonia, 5.0 gram/hr., were passed over 4.5 grams of the catalyst at 450° C. and 1 atmosphere pressure.

The conversion to products was approximately 40 percent, based on the ether, and the selectively to ethyl amines was about 85 percent by weight. The ratio of ethylamine to diethylamine to triethylamine was 65/26/9 percent by weight respectively, showing the selective production of the primary amine.

EXAMPLE 9

Ethyl alcohol and ammonia were reacted over the HZSM-5 catalyst in comparable amounts and under conditions similar to those of Example 8. In this instance, the conversion was lower, with the production of more side reaction products. The ratios of ethyl amines formed, however, were similar to those observed in Example 8.

EXAMPLE 10

In a manner similar to that described in Example 8, n-propyl alcohol and ammonia are contacted with HZSM-5 catalyst under similar conditions of reaction and with similar weight hourly space velocities. Normal propylamine is the only aliphatic amine product produced in this reaction.

It is to be understood that the foregoing description is merely illustrative of preferred embodiments of the invention of which many variations may be made by those skilled in the art within the scope of the following claims without departing from the spirit thereof.

I claim:

1. A process for the selective production of primary aliphatic amines over secondary and tertiary amines by reaction of an ether characterized by the formula R—O—R' where R and R' are independently alkyl of 2 to 5 carbon atoms, with ammonia in the presence of a crystalline aluminosilicate catalyst of ZSM-5, ZSM-11 or ZSM-21 at a temperature between about 300° and about 500° C; a pressure between about 14.7 and 1000 psig with the relative feed rates, expressed in grams per hour of (1) ether and (2) ammonia being within the range of 1:1 to 5:1.

2. The process of claim 1 wherein said crystalline aluminosilicate is characterized by a silica/alumina ratio in excess of 30.

3. The process of claim 1 wherein said reaction is carried out at a temperature between about 350° and about 450° C at a pressure between about 14.7 and 1000 psig with the relative rates, measured in grams per hour, of (1) ether and (2) ammonia being within the range of 2:1 to 4:1.

4. The process of claim 1 wherein the crystalline aluminosilicate is ZSM-5.

5. The process of claim 1 wherein the crystalline aluminosilicate is ZSM-11.

6. The process of claim 1 wherein the crystalline aluminosilicate is ZSM-21.

7. The process of claim 3 wherein the crystalline aluminosilicate is ZSM-5.

8. The process of claim 3 wherein the crystalline aluminosilicate is ZSM-11.

9. The process of claim 3 wherein the crystalline aluminosilicate is ZSM-21.

10. The process of claim 1 wherein said ether is diethyl ether.

* * * * *

UNITED STATES PATENT AND TRADEMARK OFFICE
CERTIFICATE OF CORRECTION

PATENT NO. : 4,082,805
DATED : April 4, 1978
INVENTOR(S) : Warren W. Kaeding

It is certified that error appears in the above-identified patent and that said Letters Patent are hereby corrected as shown below:

Column 2, line 32 (Table I), "$\pm$ 0.1" should be between --6.04 and 5.97--.

Column 8, line 9, "selectively" should read --selectivity--.

Signed and Sealed this

Third Day of July 1979

[SEAL]

Attest:

LUTRELLE F. PARKER

Attesting Officer      Acting Commissioner of Patents and Trademarks